June 11, 1957     M. SELDEEN     2,795,227
TOBACCO SMOKE FILTER
Filed Feb. 15, 1955
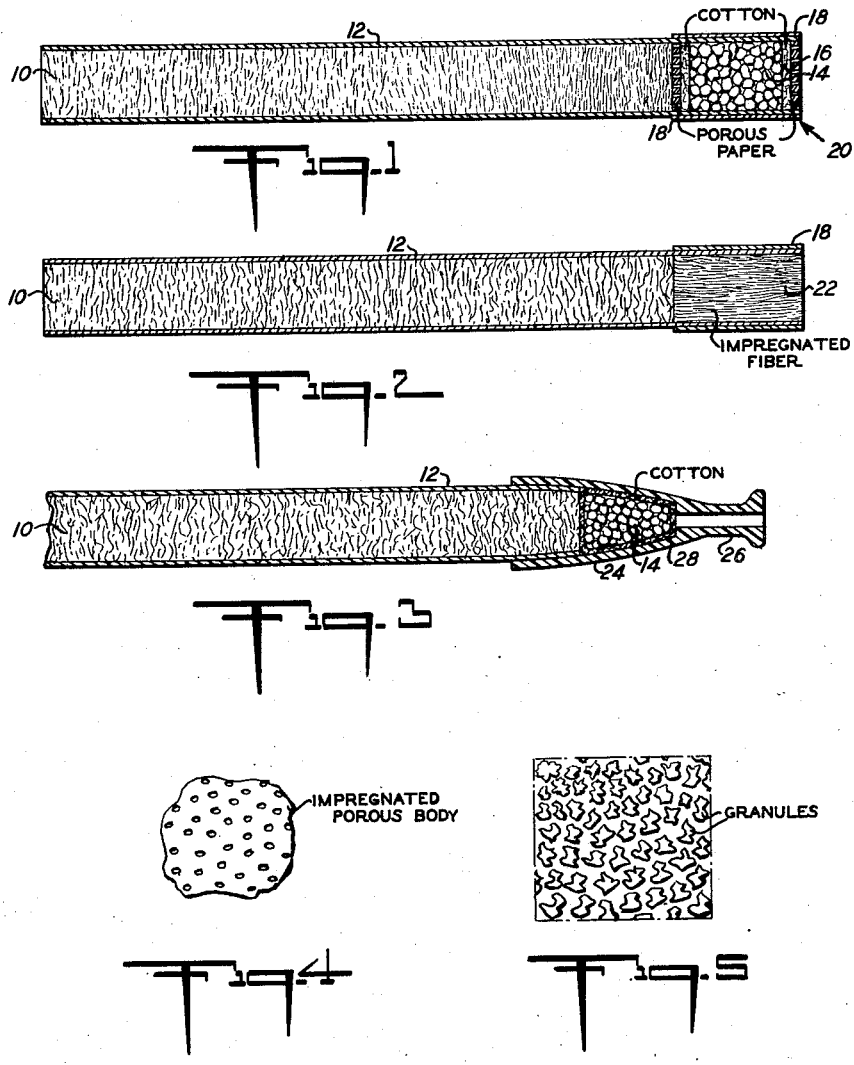
INVENTOR
MARTIN SELDEEN
BY
ATTORNEYS

United States Patent Office 2,795,227
Patented June 11, 1957

2,795,227

TOBACCO SMOKE FILTER

Martin Seldeen, Silver Spring, Md.

Application February 15, 1955, Serial No. 488,192

9 Claims. (Cl. 131—10)

This invention relates to an improved filter for tobacco smoke adapted to react with and precipitate nitrogenous components such as nicotine from the smoke, thereby removing such harmful tobacco smoke components. More particularly, this invention relates to an improved tobacco filter substance comprising zirconium and substantially non-volatile compounds thereof.

According to my invention, I have found that zirconium and its non-volatile compounds such as oxides, hydroxides, and salts, react or combine with the nitrogenous components of tobacco smoke to precipitate the same and thereby are capable of removing these components from the smoke. The activity of zirconium and its compounds appears to be chemically able to bond the nitrogenous substances to the zirconium substance although it may be a result of adsorption or absorption by the zirconium substance. Whatever may be the true explanation, chemical or physical, as a matter of theory, to which this invention is not to be limited, I have found that exposure of tobacco smoke to the zirconium substance results in efficient removal of the noxious nitrogenous substances suspended therein.

In the practice of this invention, the zirconium substance, zirconium and its compounds, is used as a tobacco smoke filtering element in a form whereby a large surface area of the substance will be exposed to the smoke for optimum contact. Thus, the zirconium substance as a solid may be granulated into particles ranging from about 10 to 200 in U. S. standard mesh screen size assembled together as a particulate porous body and the smoke passed therethrough as a filter. The larger granules in particle size of 10 to 50 may be loosely packaged as such into a filter body, since in that large particles size with correspondingly large interstices between particles, they do not tend to impede the passage of the smoke. Where the particles are smaller such as 50 to 300 mesh or even finer, they are desirably intermixed with a carrier of other granular substance or even fibrous substance, which provides the desired filter base porosity in or on which the zirconium substance is carried, so that the small particle size of the zirconium substance does not tend to pack densely to impede passage of smoke therethrough as a filter.

The property of precipitating the nitrogenous smoke components appears in all of the zirconium compounds, including metallic zirconium, so far as I am aware. The preferred zirconium compounds are those which are most heat stable such as the oxides. Some of the zirconium compounds, such as organo-zirconium compounds like the organic acid salts when heated in air decompose to non-volatile zirconium oxide. Many zirconium compounds such as the chlorides and bromides are volatilizable by heat to make their use as a filter substance for hot smoke less desirable for that reason. Thus, while heat stable zirconium compounds are preferred, the other types may be useful where the volatilized substance is not in itself objectionable as a component of the smoke. For example, a zirconium compound such as a halide, which is volatilizable in the active combustion zone of the tobacco, would not ordinarily, as part of a filter element of a cigarette, be exposed to actual combustion temperatures. Particularly, moreover, if such zirconium halide were used as the filter element of a pipe, or other smoking device, the possible exposure to combustion temperatures would be even more remote.

Typically most desirable compounds of zirconium are elemental zirconium, both higher and lower oxides of zirconium, zirconium hydroxide, zirconium carbonate, zirconium carbide, zirconium silicate, zirconium phosphate, zirconium sulfate, zirconium acetate and zirconium citrate. The compounds may contain water of hydration or may be used in an anhydrous form. The zirconium may also be used in double salts wherein zirconium appears in the anion such as calcium zirconate. The more heat stable compounds of zirconium, such as the oxides, hydroxides, carbonates and silicates, are preferred.

Where the zirconium compound is soluble in a solvent, it may be applied in solution to a porous carrier base and the solvent, such as water, evaporated to leave the carrier homogeneously impregnated with the zirconium salt. The carrier need not be fibrous but may itself be a typical inert inorganic substance, for example, granules of aluminum oxide or silica gel, diatomaceous earth, fuller's earth, or even fibrous asbestos, may be impregnated with a solution of soluble zirconium salt and dried. Alternatively, the soluble zirconium salt such as a chloride may be precipitated upon the granulated or fibrous carrier; or the carrier together with the zirconium salt in solution may be precipitated simultaneously. For example, sodium silicate may be coagulated with any acid to silica gel in the presence of a solution of zirconium salt. Alternatively, again, alum may be coagulated with a solution of the zirconium salt carrying down with the hydrous aluminum oxide gel formed an impregnating quantity of the zirconium salt.

Again, where the zirconium compound is insoluble, a fine powder thereof may be mixed with a powdered or granulated carrier. Such powdered zirconium substance may also be suspended in a solution of soluble silica or other inert hydrous oxide forming substances and the hydrous oxide precipitated to a gelatinous form thereby binding therein the homogeneous finely powdered zirconium substance.

In any of these several ways, the zirconium substance alone or in a carrier base is converted to a gas permeable body to be used as a filter substance for tobacco smoke. That filter substance is assembled together with the tobacco in a wrapper as in a typical filter type cigarette, or the smoke filter itself, suitably packaged to be smoke permeable, is mounted in a smoking device in a manner to conduct the smoke through the filter substance. Such smoking device may be any known, such as, for an example, a cigarette, pipe or cigarette holder.

The drawing illustrates several modes of practicing this invention.

Figure 1 is a longitudinal section through a filter type cigarette, the zirconium substance or the zirconium impregnated filter substance being disposed in granular form;

Figure 2 is a longitudinal section through a filter type cigarette, the zirconium substance being impregnated on a fibrous base;

Figure 3 is a longitudinal section through a cigarette and cigarette holder illustrating the disposal of the filter substance in a cigarette holder as an auxiliary smoking device;

Figure 4 is a detail illustrating a porous carrier body impregnated with zirconium substance; and Figure 5 is an enlarged detail of the granules comprising zirconium substance.

As shown in the drawing, Figure 1, a typical cigarette comprising tobacco granules 10, is wrapped in cigarette paper 12, the end thereof continues about and encases granules of filtering substance 14 secured between inner and outer layers of cotton 16 which may, optionally, be further reinforced at its inner and outer sides with porous paper 18. In this form, the granules may be fragments of zirconium substance such as zirconium oxide screened to a mesh size of 10 to 50 assembled as shown with cotton barriers at both ends and further, optionally, with crinkled or porous paper, at its inner and outer end as shown in Figure 1. The filter assembly is finally wrapped with the tobacco in typical cigarette paper and a final wrapping about the filter tip 20 may be applied of such material as stiffened paper or cork.

Alternatively, the zirconium substance may be a powder or soluble salt disposed upon any carrier base as mentioned above and details of which are given below in the examples, that carrier base being granulated to the form shown in Figures 1 and 5.

Figure 2 illustrates a filter tip construction for a cigarette wherein the filter comprises matted porous fiber which has been impregnated with a solution or a fine powder of the zirconium substance. That carrier base may be crinkled, folded or naturally porous paper, matted fibers like cotton, or other fibrous substance such as asbestos, shown in Figure 2 as the element 22, the structure of the cigarette otherwise being conventional as described for Figure 1.

Figure 3 shows a typical cigarette comprising tobacco 10 wrapped in cigarette paper 12 which is secured within the cylindrical chamber of a conventional cigarette holder 24. As shown, the chamber of the cigarette holder 24 is tapered at its inner end toward the mouth piece 26, a small filtering element being disposed within that inner tapered portion of the holder chamber. Somewhat similar to the filter of Figure 1, the filter may comprise granules 14 of zirconium substance encased in a matted cotton sheet 28.

As mentioned above, the zirconium substance may be disposed in the filter body in several ways of which the following are specific examples:

*Example 1*

Zirconium dioxide is finely powdered to about 200 mesh particle size and is suspended as a slurry in an alkaline solution of 50% sodium silicate in water having a pH of 11.5 to form a 25% zirconium dioxide suspension in the sodium silicate solution. The slurry is then partially neutralized by dropwise addition with stirring of a 10% solution of hydrochloric acid until the whole mass sets to a stiff gel. The product is then dialyzed to remove water soluble salt and dried in an oven at 150° F. The mass is then broken into granules as shown in detail at Figure 5. These granules are then assembled with cotton plugs at each end together with porous crinkled paper diaphragm as shown in Figure 1 to a filter type cigarette. On smoking this product, the smoke was found to have substantially reduced the analyzable quantity of nicotine normally found in the smoke and the cigarette filter after completion of the test was found to be filled with nitrogenous tars.

*Example 2*

To the same solution of sodium silicate of Example 1 finely powdered zirconium acetate was added in proportion of 35% by weight of the sodium silicate solution with stirring until homogeneous. Thereafter, as in Example 1, the soluble silica was precipitated to a gel with dilute hydrochloric acid and without further washing the gel was dried in an oven of 150° F., broken to granules of about 10 mesh size and finally ignited by heating in air to a temperature of 400° F. This product was formed into a filter type cigarette as shown in Figure 1 in the manner described in Example 1 and found to be substantially the same in its filtering effect in removing nitrogenous components from the smoke.

*Example 3*

The gels formed in Examples 1 and 2 after drying are highly porous. They do not need to be granulated into granules of any particular size. To illustrate this, the gel was broken into relatively larger size fragments and these porous bodies having the structure as shown in Figure 4 were wrapped in cotton and inserted within the mouthpiece of the cigarette holder, as shown in Figure 3, with substantially the same smoke filtering effect.

*Example 4*

A thick paste comprising of 60% of finely powdered, about 200 mesh size, zirconium hydroxide was made in water using additionally 1% of methyl cellulose as a gelatinizing and thickening agent to form thereby a smooth form-sustainable but pressure flowable paste. The paste was then homogeneously mixed with about 4 times its volume of washed, dust free asbestos fiber. The asbestos fiber impregnated with paste was then dried and heated for one hour at a temperature of 450° F. in air to destroy the methyl cellulose and drive off water of hydration from the zirconium hydroxide. As compared to a control heating of a similar weight quantity of unimpregnated asbestos, the weight of the asbestos had increased 100% as heat stabilized zirconium, comprising substantially zirconium oxide which contained trace quantities of undecomposed zirconium hydroxide and carbon. Thereafter, the impregnated asbestos fiber was porously assembled into a filter tip cigarette, as shown in Figure 2, and found to have the same nitrogenous smoke purifying effect as in other examples.

*Example 5*

Granulated fragments of about 10 mesh of zirconium boride, zirconium carbide, zirconium carbonate, zirconium silicate, zirconium sulfate, elemental zirconium metal, and zirconium phosphate were each wrapped in cotton and inserted into a cigarette holder, as shown in Figure 3 and used to filter smoke of a cigarette assembled therewith as shown and in each instance it was found that the nitrogenous components including some tars were removed from the smoke and deposited in the filter.

*Example 6*

A 10% solution of zirconium chloride was made in dry ethyl alcohol and porous paper strips were dipped in the solution and dried in air. The paper had increased in weight an average of about 5%. The paper was thereafter crinkled and wadded into a filter and assembled into a cigarette, as shown in Figure 2, and smoke tests applied. The zirconium chloride impregnated paper removed nitrogenous components equally as effective as other zirconium substances. However, it was found that when the combustion of the cigarette was allowed to closely approach the filter tip, some trace quantities of zirconium chloride appeared in the smoke.

As thus described, it is found that zirconium and its compounds herein referred to as zirconium substance or a zirconium compound, intended in the generic sense, have the general property of efficiently precipitating nitrogenous components from the smoke. The zirconium substance is granulated to impart desired porosity as a filter for exposing a large quantity in surface contact of the zirconium substance to the smoke or it is disposed in a carrier of various types useful in filtering.

The quantity of zirconium used is not critical, the effectiveness appearing to depend upon surface exposure, and as little as 1% of exposed zirconium surface appears to have a definite smoke purifying effect, but the filtering body may be composed entirely of zirconium substance. It is preferred to have in the filter surface from 5 to 100% zirconium substance, that quantity being modified preferably only for practical construction of a filter base.

What is claimed is:

1. A tobacco smoking device having a smoke filtering element, including a substance comprising a substantial quantity of zirconium mounted in position therein exposed to the smoke.

2. A cigarette having a smoke filtering element, including a substance comprising a substantial quantity of zirconium mounted in position therein exposed to the smoke.

3. A filter element for tobacco smoke including a substance comprising a substantial quantity of zirconium mounted in position therein exposed to the smoke.

4. A device as defined in claim 1 wherein the zirconium substance is disposed in granular form to particles of a size large enough to be smoke permeable.

5. A device as defined in claim 1 wherein the zirconium substance is selected from the group consisting of elemental zirconium and the oxides, hydroxides, carbides, silicates, carbonates, phosphates, sulfates and salts of organic acids of zirconium.

6. A device as defined in claim 1 wherein the zirconium substance is disposed in substantial concentration in a smoke permeable carrier body.

7. A device as defined in claim 1 wherein the zirconium substance is disposed in a substantial concentration in a smoke permeable fibrous base as a carrier body.

8. A device as defined in claim 1 wherein the zirconium substance is disposed in a porous inert inorganic carrier body.

9. A device as defined in claim 1 wherein the zirconium substance comprises granules of zirconium dioxide.

References Cited in the file of this patent

UNITED STATES PATENTS

| 636,088 | Voron | Oct. 31, 1899 |
| 1,985,840 | Sadtler | Dec. 25, 1934 |
| 2,108,860 | Kauffman | Feb. 22, 1938 |
| 2,378,904 | Bates | June 26, 1945 |

FOREIGN PATENTS

| 813,324 | France | Feb. 22, 1937 |
| 1,060,982 | France | Nov. 25, 1953 |